US008516808B2

(12) United States Patent
Aoyama et al.

(10) Patent No.: US 8,516,808 B2
(45) Date of Patent: Aug. 27, 2013

(54) EXHAUST PURIFICATION DEVICE OF INTERNAL COMBUSTION ENGINE

(75) Inventors: Taro Aoyama, Susono (JP); Yutaka Tanai, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 364 days.

(21) Appl. No.: 12/918,823

(22) PCT Filed: Feb. 18, 2009

(86) PCT No.: PCT/JP2009/053303
§ 371 (c)(1),
(2), (4) Date: Nov. 24, 2010

(87) PCT Pub. No.: WO2009/104799
PCT Pub. Date: Aug. 27, 2009

(65) Prior Publication Data
US 2011/0061370 A1   Mar. 17, 2011

(30) Foreign Application Priority Data

Feb. 22, 2008  (JP) ................. 2008-041884

(51) Int. Cl.
*F01N 3/00* (2006.01)
(52) U.S. Cl.
USPC ............. 60/301; 60/274; 60/286; 60/297
(58) Field of Classification Search
USPC ............. 60/286, 297, 301, 303, 274
See application file for complete search history.

(56) References Cited

U.S. PATENT DOCUMENTS

| 6,220,019 | B1 * | 4/2001 | Sugiura et al. ............. 60/285 |
| 7,093,427 | B2 * | 8/2006 | van Nieuwstadt et al. ..... 60/286 |
| 7,475,536 | B2 * | 1/2009 | Wada et al. .............. 60/295 |
| 7,726,118 | B2 * | 6/2010 | Oberski et al. ........... 60/286 |
| 7,805,929 | B2 * | 10/2010 | Driscoll ................ 60/286 |
| 8,181,448 | B2 * | 5/2012 | Kwon .................. 60/286 |

FOREIGN PATENT DOCUMENTS

| JP | 7 279650 | 10/1995 |
| JP | 2001 27113 | 1/2001 |
| JP | 2003 293743 | 10/2003 |
| JP | 2005 337133 | 12/2005 |
| JP | 2006 118413 | 5/2006 |
| JP | 2006 257936 | 9/2006 |
| JP | 2006 342736 | 12/2006 |

* cited by examiner

*Primary Examiner* — Binh Q Tran
(74) *Attorney, Agent, or Firm* — Oblon, Spivak, McClelland, Maier & Neustadt, L.L.P.

(57) ABSTRACT

In an internal combustion engine, an $NO_X$ selective reduction catalyst (15) is arranged in an engine exhaust passage, an aqueous urea solution is fed to the $NO_X$ selective reduction catalyst (15) and the ammonia generated from the aqueous urea solution is made to be adsorbed at the $NO_X$ selective reduction catalyst (15), and the adsorbed ammonia is used to selectively reduce $NO_X$. At the time the engine is stopped, when the ammonia adsorption amount at the $NO_X$ selective reduction catalyst (15) is smaller than a predetermined target amount of adsorption, the urea necessary for making the ammonia adsorption amount at the $NO_X$ selective reduction catalyst (15) the target amount of adsorption is fed to the $NO_X$ selective reduction catalyst (15) at the time the engine is stopped.

14 Claims, 6 Drawing Sheets

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging a denitration catalyst in an engine exhaust passage, feeding air containing ammonia upstream of the denitration catalyst to make ammonia be adsorbed at the denitration catalyst, and using the adsorbed ammonia to reduce the $NO_X$ in the exhaust gas (for example, see Japanese Patent Publication (A) No. 2006-257936). In this internal combustion engine, to make the $NO_X$ reduction action by the denitration catalyst start right after engine startup, when the engine should be started, before starting the engine, the denitration catalyst is preheated and, after the denitration catalyst is activated, the engine is started.

In this regard, in the past, an $NO_X$ selective reduction catalyst comprised of for example Fe zeolite was used for reducing $NO_X$ in the presence of ammonia. In this case, usually, an aqueous urea solution is fed into the engine exhaust passage upstream of the $NO_X$ selective reduction catalyst, the ammonia produced from the aqueous urea solution is made to be adsorbed at the $NO_X$ selective reduction catalyst, and the ammonia adsorbed at the $NO_X$ selective reduction catalyst is used to reduce the $NO_X$ in the exhaust gas.

Now then, usually, in an internal combustion engine, when there is a request to start the engine, it is necessary to immediately start the engine. Further, an $NO_X$ selective reduction catalyst rises in temperature far more easily than the above denitration device. Therefore, when a $NO_X$ selective reduction catalyst is used, usually, when there is a request to start the engine, the engine is immediately started and the temperature of the $NO_X$ selective reduction catalyst is caused to rise by the exhaust gas exhausted from the engine.

In this way, if the temperature of the $NO_X$ selective reduction catalyst is raised and the $NO_X$ selective reduction catalyst is activated, the $NO_X$ reduction action is started. At this time, to reduce the $NO_X$ well, a sufficient amount of ammonia has to be adsorbed over the entire $NO_X$ selective reduction catalyst. For this reason, it may be considered to feed aqueous urea solution to the $NO_X$ selective reduction catalyst right after engine startup. However, right after engine start, the temperature at the wall surfaces inside the exhaust passage is low, so the fed aqueous urea solution continues to stick on the wall surfaces inside the exhaust passage in a liquid form or, because the exhaust gas temperature is low, the aqueous urea solution is not sufficiently atomized, so it is difficult to get all of the fed aqueous urea solution to be adsorbed in the form of ammonia at the $NO_X$ selective reduction catalyst as a whole. That is, at the time of engine start, even if feeding aqueous urea solution, it is not possible to reduce the $NO_X$ well early on.

DISCLOSURE OF INVENTION

An object of the present invention is to provide an exhaust purification device of an internal combustion engine able to reduce $NO_X$ early on at the time of engine start.

According to the present invention, there is provided an exhaust purification device of an internal combustion engine arranging an $NO_X$ selective reduction catalyst in an engine exhaust passage, feeding urea to the $NO_X$ selective reduction catalyst and making ammonia generated from the urea be adsorbed at the $NO_X$ selective reduction catalyst, and mainly using an adsorbed ammonia to selectively reduce $NO_X$ contained in an exhaust gas, wherein at the time the engine is stopped, when an ammonia adsorption amount at the $NO_X$ selective reduction catalyst is smaller than a predetermined target amount of adsorption, urea necessary for making the ammonia adsorption amount at the $NO_X$ selective reduction catalyst the target amount of adsorption is fed to the $NO_X$ selective reduction catalyst at the time the engine is stopped.

That is, at the time the engine is stopped, the temperature of the exhaust system as a whole is high, so a sufficient amount of ammonia can be made to be adsorbed over the entire $NO_X$ selective reduction catalyst and therefore $NO_X$ can be purified well early on at the time of engine start.

BEST MODE FOR CARRYING OUT THE INVENTION

Figure 1:
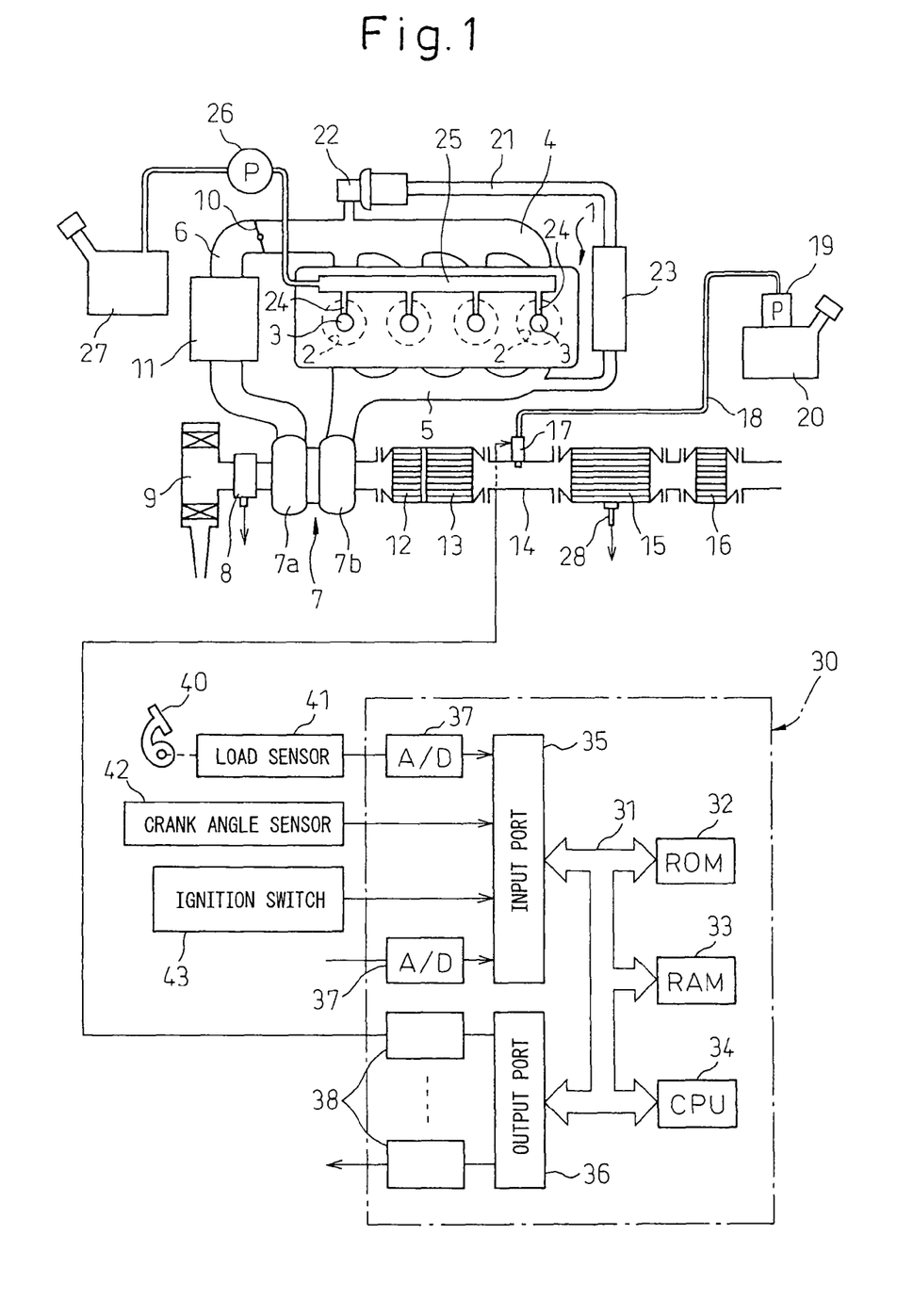
FIG. 1 is an overall view of a compression ignition type internal combustion engine.

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air amount detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of an oxidation catalyst 12. Downstream of the oxidation catalyst 12, a particulate filter 13 is arranged adjacent to the oxidation catalyst 12 for collecting particulate matter contained in the exhaust gas, while the outlet of this particulate filter 13 is connected through an exhaust pipe 14 to the inlet of an $NO_X$ selective reduction catalyst 15. The outlet of this $NO_X$ selective reduction catalyst 15 is connected to an oxidation catalyst 16.

Inside an exhaust pipe 14 upstream of the $NO_X$ selective reduction catalyst 15, an aqueous urea solution feed valve 17 is arranged. This aqueous urea solution feed valve 17 is connected through a feed pipe 18 and a feed pump 19 to an aqueous urea solution tank 20. The aqueous urea solution stored inside the aqueous urea solution tank 20 is injected by the feed pump 19 into the exhaust gas flowing within the exhaust pipe 14 from the aqueous urea solution feed valve 17, and the ammonia (($NH_2$)$_2$$CO$+$H_2O$→2$NH_3$+$CO_2$) generated from urea is adsorbed in the $NO_X$ selective reduction catalyst 15. $NO_X$ contained in the exhaust gas is reduced by the ammonia adsorbed in the $NO_X$ selective reduction catalyst 15.

The exhaust manifold 5 and the intake manifold 4 are connected to each other through an exhaust gas recirculation (hereinafter referred to as the "EGR") passage 21. Inside the EGR passage 21 is arranged an electronic control type EGR control valve 22. Further, around the EGR passage 21 is arranged a cooling device 23 for cooling the EGR gas flowing through the inside of the EGR passage 21. In the embodiment shown in FIG. 1, the engine cooling water is guided through the cooling device 23, where the engine cooling water is used to cool the EGR gas. On the other hand, each fuel injector 3 is connected through a fuel feed pipe 24 to a common rail 25. This common rail 25 is connected through an electronically controlled variable discharge fuel pump 26 to a fuel tank 27. The fuel stored in the fuel tank 27 is fed by the fuel pump 26 into the common rail 25, and the fuel fed to the inside of the common rail 25 is fed through each fuel pipe 24 to the fuel injectors 3.

An electronic control unit 30 is comprised of a digital computer provided with a ROM (read only memory) 32, RAM (random access memory) 33, CPU (microprocessor) 34, input port 35, and output port 36 all connected to each other by a bi-directional bus 31. A temperature sensor 28 for detecting a temperature of the bed of the $NO_X$ selective reduction catalyst 15 is attached to the $NO_X$ selective reduction catalyst 15, and the output signals of this temperature sensor 28 and intake air amount detector 8 are input through corresponding AD converters 37 into the input port 35.

On the other hand, the accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. In addition, the input port 35 has a crank angle sensor 42 generating an output pulse each time the crank shaft rotates by for example 15° connected to it. Further, ON and OFF signals of an ignition switch 43 is input into the input port 35.

The oxidation catalyst 12 carries for example a platinum or other precious metal catalyst. This oxidation catalyst 12 acts to convert NO contained in the exhaust gas to $NO_2$ and acts to oxidize the HC contained in the exhaust gas. That is, $NO_2$ is stronger than NO in oxidizing ability and therefore if NO is converted to $NO_2$, the oxidation reaction of particulate matter trapped on the particulate filter 13 is promoted and, further, the reduction action by ammonia at the $NO_X$ selective reduction catalyst 15 is promoted. On the other hand, if HC is adsorbed at the $NO_X$ selective reduction catalyst 15, the amount of adsorption of ammonia is reduced, so the $NO_X$ purification rate falls. However, in the example shown in FIG. 1, the oxidation catalyst 12 is used to oxidize the HC, so the $NO_X$ purification rate is prevented from falling.

As the particulate filter 13, a particulate filter not carrying a catalyst may be used, while a particulate filter carrying for example a platinum or other such precious metal catalyst may also be used. On the other hand, the $NO_X$ selective reduction catalyst 15 is comprised of the ammonia adsorption type Fe zeolite. The oxidation catalyst 16 carries a precious metal catalyst comprised of for example platinum. This oxidation catalyst 16 acts to oxidize the ammonia leaked out from the $NO_X$ selective reduction catalyst 15.

Figure 2:
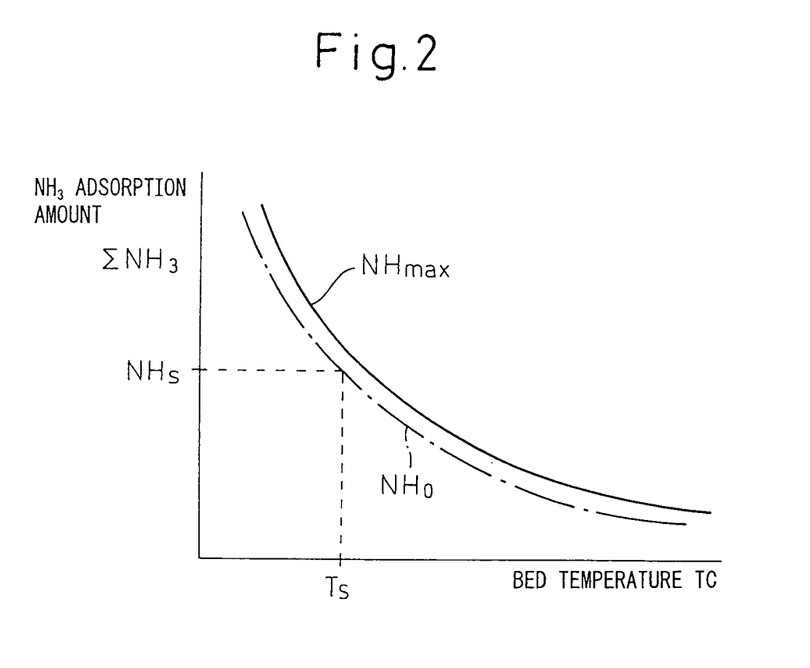
FIG. 2 is a view showing a target ammonia adsorption amount $NH_0$.

Now then, in FIG. 2, $NH_{max}$ shows the ammonia adsorption amount at the $NO_X$ selective reduction catalyst 15 in the saturated state, that is, the saturation adsorption amount. As shown in FIG. 2, this saturation adsorption amount $NH_{max}$ is a function of the bed temperature TC of the $NO_X$ selective reduction catalyst 15. The higher the bed temperature TC, the more this saturation adsorption amount $NH_{max}$ falls. On the other hand, in the embodiment according to the present invention, as shown by the broken line, an ammonia adsorption amount $\Sigma NH_3$ somewhat smaller than this saturation adsorption amount $NH_{max}$ of ammonia is made the target ammonia adsorption amount $NH_0$. Therefore, as shown in FIG. 2, this target ammonia adsorption amount $NH_0$ falls the higher the bed temperature TC of the $NO_X$ selective reduction catalyst 15 becomes. In the embodiment according to the present invention, usually, the feed of urea is controlled so that the ammonia adsorption amount $\Sigma NH_3$ at the $NO_X$ selective reduction catalyst 15 becomes the target ammonia adsorption amount $NH_0$.

Figure 3:
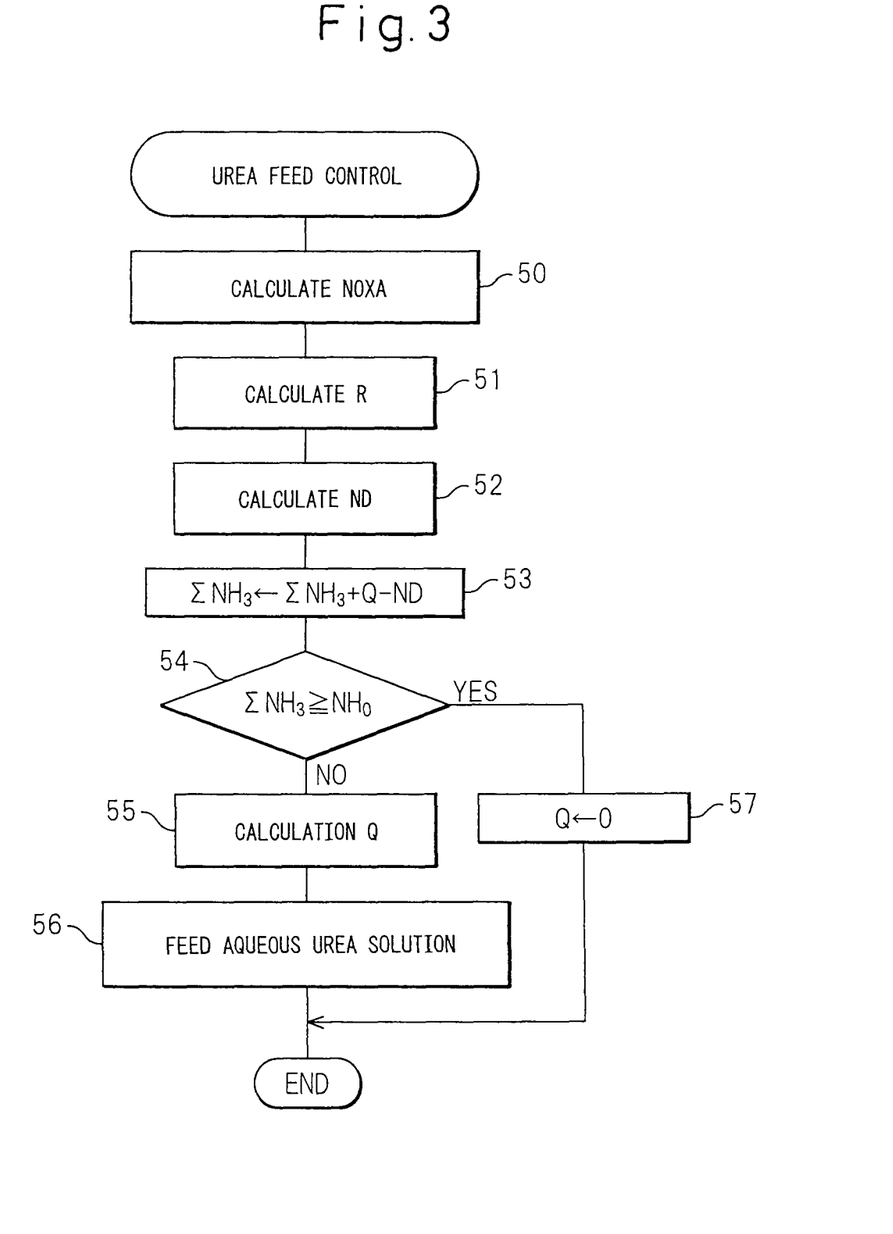
FIG. 3 is a flow chart of the control for feed of urea.

FIG. 3 shows the routine for control of the feed of urea. Note that this routine is executed by interruption every predetermined interval.

Figure 4:
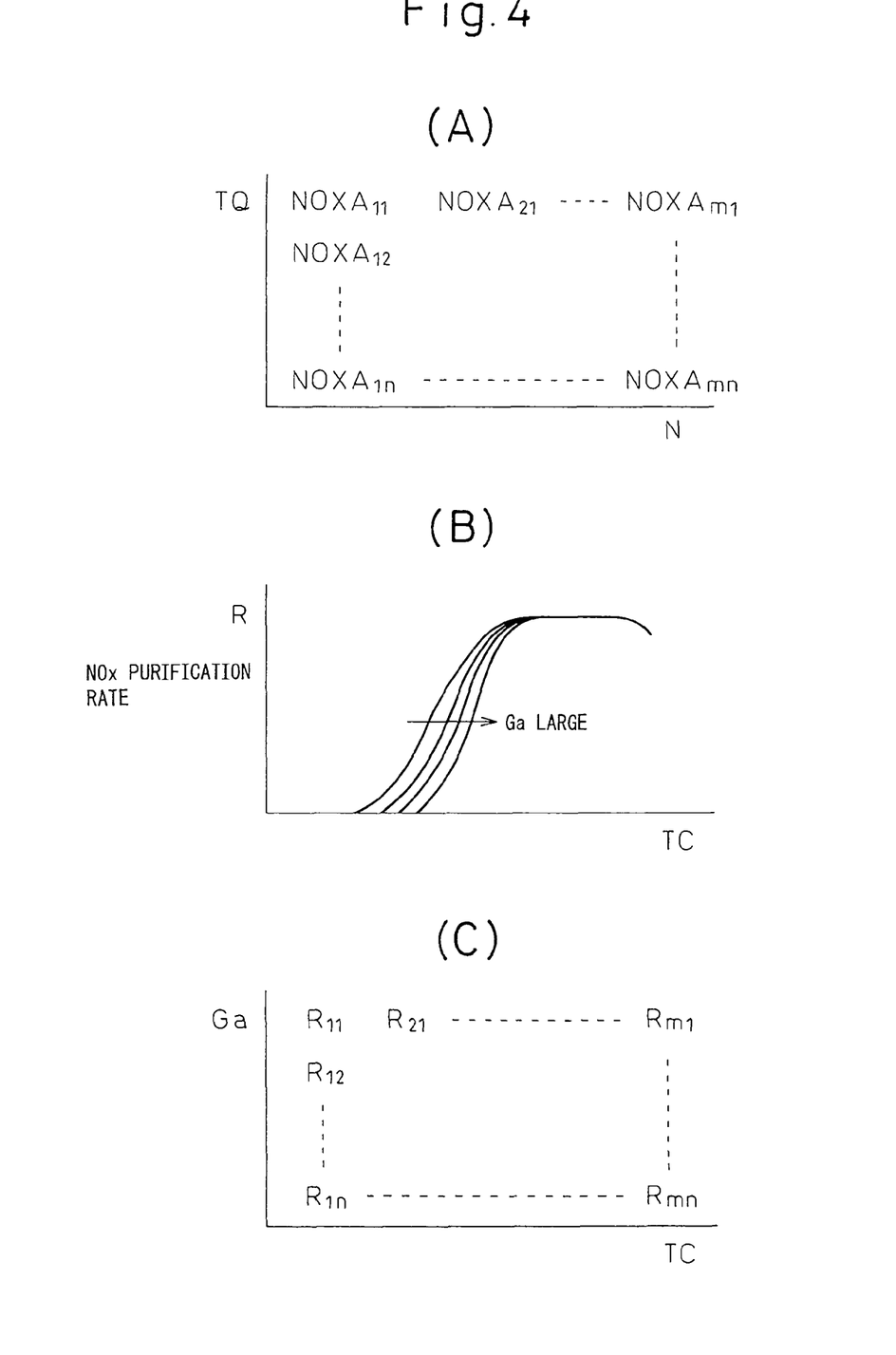
FIG. 4 is a view showing a map etc. of the $NO_X$ amount NOXA exhausted from the engine.

Referring to FIG. 3, first, at step 50, the $NO_X$ amount NOXA exhausted from the engine per unit time is calculated. This $NO_X$ amount NOXA exhausted from the engine per unit time is stored as a function of the required torque TQ and the engine speed N in the form of a map shown in FIG. 4(A) in advance in the ROM 32.

Next, at step 51, the $NO_X$ purification rate R at the $NO_X$ selective reduction catalyst 15 is calculated. This $NO_X$ purification rate R, as shown in FIG. 4(B), is a function of the bed temperature TC of the $NO_X$ selective reduction catalyst 15 and, further, changes in accordance with the amount of exhaust gas, that is, the intake air amount Ga. This $NO_X$ purification rate R, as shown in FIG. 4(C), is stored as a function of the intake air amount Ga and the bed temperature TC of the $NO_X$ selective reduction catalyst 15 in the form of a map in advance in the ROM 32.

Next, at step 52, the adsorbed ammonia amount ND consumed per unit time for reducing the $NO_X$ is calculated from the exhaust $NO_X$ amount NOXA and the $NO_X$ purification rate R. Next, at step 53, the feed ammonia amount Q fed per unit time in the form of urea is added to $\Sigma NH_3$ and the ammonia amount ND consumed is subtracted from $\Sigma NH_3$ so as to calculate the ammonia adsorption amount $\Sigma NH_3$ (←$\Sigma NH_3$+Q−ND) of the $NO_X$ selective reduction catalyst 15. Next, at step 54, it is determined if this ammonia adsorption amount $\Sigma NH_3$ is larger than the target ammonia adsorption amount $NH_0$.

When $\Sigma NH_3 < NH_0$, the routine proceeds to step 55 where the ammonia feed amount Q is calculated, next, the routine proceeds to step 56 where aqueous urea solution is fed from the aqueous urea solution feed valve 17. On the other hand, when $\Sigma NH_3 \leq NH_0$, the routine proceeds to step 57 where the ammonia feed amount Q is made zero. At this time, the feed of aqueous urea solution is stopped. In this way, the feed of urea is controlled so that the ammonia adsorption amount $\Sigma NH_3$ at the $NO_X$ selective reduction catalyst 15 becomes the target ammonia adsorption amount $NH_0$.

Now then, to make the $NO_X$ reduction action start early on at the time of engine start, before the $NO_X$ selective reduction catalyst 15 is activated, a sufficient amount of ammonia has to be adsorbed over the entire $NO_X$ selective reduction catalyst 15. Therefore, in the present invention, at the time the engine is stopped, when the amount of ammonia adsorbed at the $NO_X$ selective reduction catalyst 15 is smaller than a predetermined target amount of adsorption, the urea required for making the amount of ammonia adsorbed at the $NO_X$ selective reduction catalyst 15 this target amount of adsorption is fed to the $NO_X$ selective reduction catalyst at the time the engine is stopped.

That is, at the time the engine is stopped, the temperature of the exhaust system as a whole is high, so a sufficient amount of ammonia can be made to be adsorbed at the $NO_X$ selective reduction catalyst 15. Therefore, at the time the engine is stopped, if feeding urea to the $NO_X$ selective reduction catalyst 15 so that the amount of ammonia adsorbed at the $NO_X$ selective reduction catalyst 15 becomes the target amount of adsorption, a sufficient amount of ammonia required for reducing the $NO_X$ is adsorbed over the entire $NO_X$ selective reduction catalyst 15 at the time of engine start. As a result, it is possible to purify the $NO_X$ well from early on at the time of start of the engine.

As will be understood from the above explanation, the target amount of adsorption of ammonia at the time the engine is stopped is the amount of adsorption of ammonia required for reducing the $NO_X$ at the time of engine start. The target amount of adsorption at the time the engine is stopped is shown by $NH_S$ in FIG. 2. Note that, this target amount of adsorption $NH_S$ matches with the target ammonia adsorption amount $NH_0$ when the bed temperature TC of the $NO_X$ selective reduction catalyst 15 is $T_S$.

That is, as explained above, during engine operation, the ammonia adsorption amount $\Sigma NH_3$ at the $NO_X$ selective reduction catalyst 15 is controlled to the target ammonia adsorption amount $NH_0$. Therefore, when the bed temperature TC of the $NO_X$ selective reduction catalyst 15 is lower than the $T_S$ shown in FIG. 2 right before the engine is stopped, a larger amount of ammonia is adsorbed at the $NO_X$ selective reduction catalyst 15 than the target amount of adsorption $NH_3$ of the ammonia at the time of engine start.

As opposed to this, when the bed temperature TC of the $NO_X$ selective reduction catalyst 15 is higher than $T_S$ shown in FIG. 2 right before the engine is stopped, the amount of ammonia adsorbed at the $NO_X$ selective reduction catalyst 15 is smaller than the target amount of adsorption $NH_S$ of ammonia at the time of engine start. Therefore, in this case, at the time the engine is stopped, it is necessary to feed urea to increase the ammonia adsorption amount $\Sigma NH_3$ at the $NO_X$ selective reduction catalyst 15.

However, to increase the ammonia adsorption amount $\Sigma NH_3$ in this way, the bed temperature TC of the $NO_X$ selective reduction catalyst 15 has to be lowered. In this case, for example, if continuing operation of the engine by a low load operation like idling, the bed temperature TC of the $NO_X$ selective reduction catalyst 15 will fall.

Therefore, in a first embodiment of the present invention, when an operation for stopping the engine is performed, if the ammonia adsorption amount $\Sigma NH_3$ at the $NO_X$ selective reduction catalyst 15 is smaller than the target amount of adsorption $NH_S$ at the time the engine is stopped, the engine operation is continued to lower the temperature TC of the $NO_X$ selective reduction catalyst 15, the urea necessary for making the ammonia adsorption amount $\Sigma NH_3$ at the $NO_X$ selective reduction catalyst 15 the target amount of adsorption $NH_S$ at the time the engine is stopped is fed to the $NO_X$ selective reduction catalyst 15, then the engine is stopped. Note that, "when an operation for stopping the engine is performed" are includes, for example, when an instruction for stopping the engine is given in a hybrid engine where the engine is driven in accordance with need.

Figure 5:
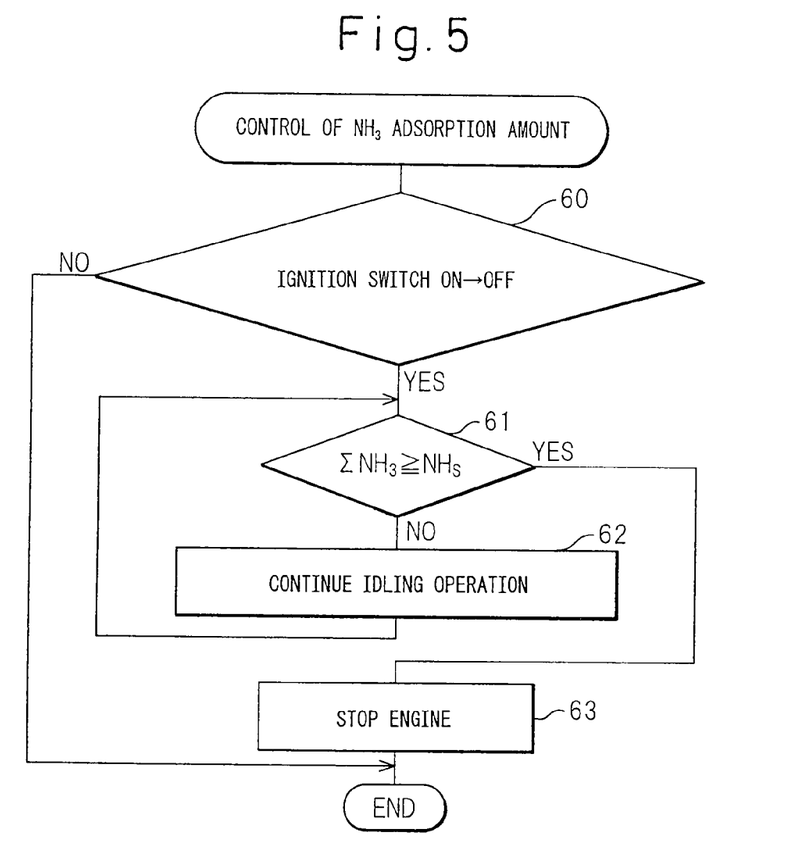
FIG. 5 is a flow chart of the control of the amount of ammonia adsorbed at the time the engine is stopped.

FIG. 5 shows the control routine of the ammonia adsorption amount at the time the engine is stopped for working this first embodiment.

Referring to FIG. 5, first, at step 60, it is determined if the ignition switch 43 has been switched from on to off, that is, if an operation for stopping the engine has been performed. When the ignition switch 43 has been switched from on to off, that is, when an operation to stop the engine has been performed, the routine proceeds to step 61 where it is determined if the ammonia adsorption amount $\Sigma NH_3$ is larger than the target amount of adsorption $NH_S$ of the ammonia at the time the engine is stopped. Note that, in this case, as the ammonia adsorption amount $NH_3$, the ammonia adsorption amount $\Sigma NH_3$ calculated at step 53 of FIG. 3 is used.

When it is determined at step 61 that $\Sigma NH_3 \geq NH_S$, the routine proceeds to step 63 where the engine is stopped. As opposed to this, when it is determined at step 61 that $\Sigma NH_3 < NH_2$, that is, when the ammonia adsorption amount $\Sigma NH_3$ is smaller than the target amount of adsorption $NH_S$ of ammonia at the time the engine is stopped, the routine proceeds to step 62 where the engine idling operation is, continued, then the routine again returns to step 61. While the engine idling operation is continuing, the bed temperature TC of the $NO_X$ selective reduction catalyst 15 gradually falls. Along with this, by the urea feed control shown in FIG. 3, the ammonia adsorption amount $\Sigma NH_3$ at the $NO_X$ selective reduction catalyst 15 is gradually made to increase. Next, if it is judged at step 61 that $\Sigma NH_3 \geq NH_S$, the routine proceeds to step 63 where the engine is stopped.

Figure 6:
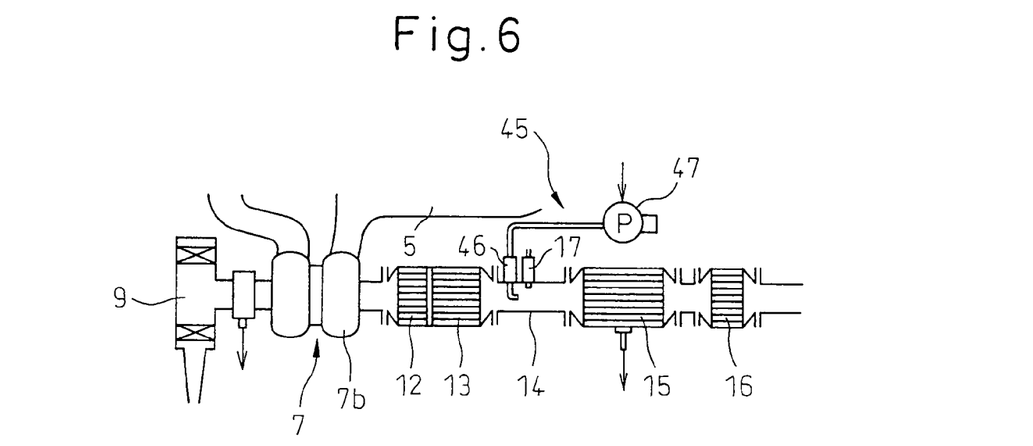
FIG. 6 is a view showing part of a compression ignition type internal combustion engine of another embodiment.

FIG. 6 shows a second embodiment. In this second embodiment, a cooling device 45 is provided for cooling the $NO_X$ selective reduction catalyst 15. In the embodiment shown in FIG. 6, this cooling device 45 is comprised of a cooling use air feed valve 46 arranged in the exhaust pipe 14 and an air pump 47 for sending outside air to this air feed valve 46. When an operation is performed to stop the engine, when an engine idling operation is continued to lower the bed temperature TC of the $NO_X$ selective reduction catalyst 15, during that time, air is fed from the air feed valve 46 to the $NO_X$ selective reduction catalyst 15. This air is used to cool the $NO_X$ selective reduction catalyst 15.

Figure 7:
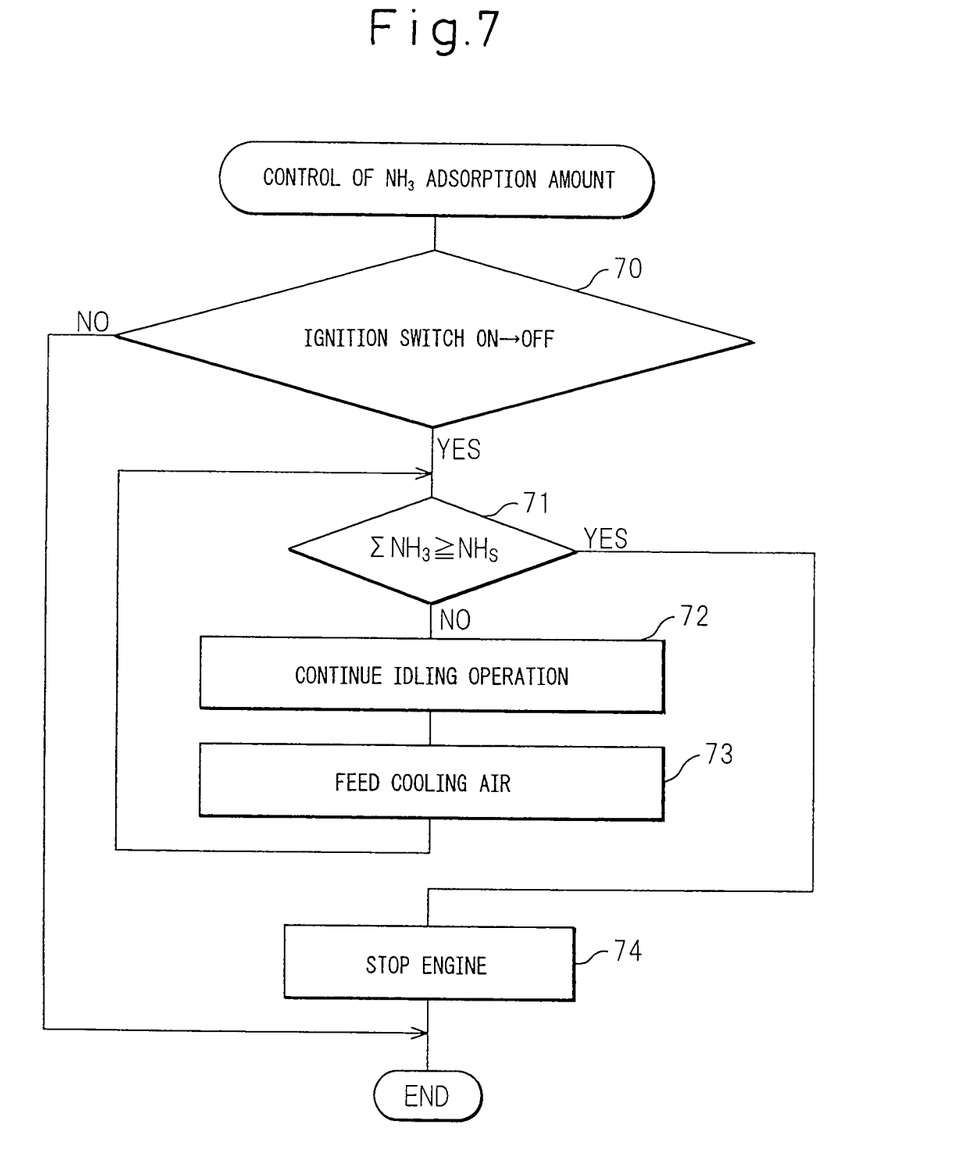
FIG. 7 is a flow chart of the control of the amount of ammonia adsorbed at the time the engine is stopped.

FIG. 7 shows the control routine of the ammonia adsorption amount at the time the engine is stopped for working this second embodiment.

Referring to FIG. 7, first, at step 70, it is determined if the ignition switch 43 has been switched from on to off, that is, whether an operation to stop the engine has been performed. When the ignition switch 43 is switched from on to off, that is, when an operation to stop the engine has been performed, the routine proceeds to step 71 where it is determined if the ammonia adsorption amount $\Sigma NH_3$ is larger than the target amount of adsorption $NH_S$ of ammonia at the time the engine is stopped. Note that, in this case as well, as the ammonia adsorption amount $\Sigma NH_3$, the ammonia adsorption amount $\Sigma NH_3$ calculated at step 53 of FIG. 3 is used.

When it is determined at step 71 that $\Sigma NH_3 \geq NH_S$, the routine proceeds to step 74 where the engine is stopped. As opposed to this, when it is determined at step 71 that $\Sigma NH_3 < NH_S$, that is, when the ammonia adsorption amount $\Sigma NH_3$ is smaller than the target amount of adsorption $NH_S$ of ammonia at the time the engine is stopped, the routine proceeds to step 72 where the engine idling operation is continued. Next, at step 73, the air pump 47 is operated and cooling air is fed from the air feed valve 46. Therefore, the bed temperature TC of the $NO_X$ selective reduction catalyst 15 rapidly falls and, along with this, due to the urea feed control shown in FIG. 3, the ammonia adsorption amount $\Sigma NH_3$ at the $NO_X$ selective reduction catalyst 15 is rapidly increased. Next, when it is judged at step 71 that $\Sigma NH_3 \geq NH_S$, the routine proceeds to step 74 where the engine is stopped.

LIST OF REFERENCE NUMERALS

4 ... intake manifold
5 ... exhaust manifold
7 ... exhaust turbocharger
12 ... oxidation catalyst
13 ... particulate filter
15 ... NOx selective reduction catalyst
17 ... aqueous urea solution feed valve

The invention claimed is:

1. An exhaust purification device of an internal combustion engine arranging an $NO_X$ selective reduction catalyst in an engine exhaust passage, feeding urea to the $NO_X$ selective reduction catalyst and making ammonia generated from the urea be adsorbed at the $NO_X$ selective reduction catalyst, and mainly using an adsorbed ammonia to selectively reduce $NO_X$ contained in an exhaust gas, wherein when an operation for stopping the engine is performed, if an ammonia adsorption amount at the $NO_X$ selective reduction catalyst is smaller than a predetermined target amount of adsorption, the engine continues to be operated to lower a temperature of the $NO_X$ selective reduction catalyst, the engine is stopped after urea necessary for making the ammonia adsorption amount at the $NO_X$ selective reduction catalyst the target amount of adsorption is fed to the $NO_X$ selective reduction catalyst at the time the engine is stopped.

2. An exhaust purification device of an internal combustion engine as claimed in claim 1, wherein during a time in which the engine continues to be operated, air is fed to the $NO_X$ selective reduction catalyst to cool the $NO_X$ selective reduction catalyst.

3. An internal combustion engine exhaust purification device, comprising:
   a $NO_X$ selective reduction catalyst, a urea feed device, an engine exhaust passage and an electronic control unit;
   wherein the urea feed device is operatively connected to the engine exhaust passage and the $NO_X$ selective reduction catalyst is inside the engine exhaust passage and downstream of the urea feed device,
   wherein the electronic control unit includes operative logic configured to: (i) calculate an ammonia adsorption amount at the $NO_X$ selective reduction catalyst at a time when an operation is performed to stop the internal combustion engine, (ii) continue to operate the internal combustion engine if the calculated amount of the ammonia adsorption amount at the $NO_X$ selective reduction catalyst is smaller than a predetermined target amount to thereby lower a temperature of the $NO_X$ selective reduction catalyst and to operate the urea feed device to feed urea to the $NO_X$ selective reduction catalyst, (iii) stop the internal combustion engine after the ammonia adsorption amount at the $NO_X$ selective reduction catalyst is at least the predetermined target amount.

4. The internal combustion engine exhaust purification device of as claimed in claim 3, wherein the electronic control unit, during the time in which the internal combustion engine continues to be operated after operation is performed to stop the internal combustion engine, feeds air to the $NO_X$ selective reduction catalyst to cool the $NO_X$ selective reduction catalyst.

5. A method for reducing the $NO_X$ from an internal combustion engine exhaust, wherein the internal combustion engine exhaust comprises an exhaust passage, a urea feed device, and an $NO_X$ selective reduction catalyst, comprising:
   feeding urea to the $NO_X$ selective reduction catalyst to generate ammonia and to adsorb the ammonia at the $NO_X$ selective reduction catalyst,
   selectively reducing $NO_X$ contained in the internal combustion engine exhaust with the ammonia adsorbed in the $NO_X$ selective reduction catalyst,
   calculating an ammonia adsorption amount at the $NO_X$ selective reduction catalyst at a time when an operation is performed to stop the internal combustion engine,
   continuing to operate the internal combustion engine if the calculated ammonia adsorption amount at the $NO_X$ selective reduction catalyst is smaller than a predetermined target amount,
   continuing to feed urea to the $NO_X$ selective reduction catalyst after the operation is performed to stop the internal combustion engine to feed urea to the $NO_X$ selective reduction catalyst and to increase the ammonia adsorption amount at the $NO_X$ selective reduction catalyst, and
   stopping the internal combustion engine after the ammonia adsorption amount at the $NO_X$ selective reduction catalyst is at least the predetermined target amount.

6. The method of claim 5, further comprising:
   feeding air to the $NO_X$ selective reduction catalyst to cool the $NO_X$ selective reduction catalyst during the time in which the internal combustion engine continues to be operated after the operation is performed to stop the internal combustion engine.

7. The exhaust purification device of an internal combustion engine as claimed in claim 1, wherein the internal combustion engine is a compression ignition type internal combustion engine.

8. The internal combustion engine exhaust purification device of claim 3, wherein the internal combustion engine is a compression ignition type internal combustion engine.

9. The method according to claim 5, wherein the internal combustion engine is a compression ignition type internal combustion engine.

10. The internal combustion engine exhaust purification device as claimed in claim 3, further comprising one or more temperature sensors operatively attached to the $NO_X$ selective reduction catalyst and the electronic control unit.

11. The method of claim 5, wherein the ammonia absorption amount at the $NO_X$ selective reduction catalyst is calculated by an electronic control unit which operates the internal combustion engine and the urea feed device.

12. The exhaust purification device of an internal combustion engine as claimed in claim 1, wherein when an operation for stopping the engine is performed, if an ammonia adsorption amount at the $NO_X$ selective reduction catalyst is larger than the predetermined target amount of adsorption, the engine is immediately stopped.

13. The internal combustion engine exhaust purification device as claimed in claim 3, wherein the electronic control unit further includes operative logic configured to: (iv) immediately stopped the internal combustion engine if an ammonia adsorption amount at the $NO_X$ selective reduction catalyst is larger than the predetermined target amount.

14. The method of claim 5, further comprising stopping the internal combustion engine if the calculated ammonia adsorption amount at the $NO_X$ selective reduction catalyst is larger than the predetermined target amount.

* * * * *